350-96.15 SR
PT017 XR 3,107,301

PULSE RESPONSIVE PHOTOSENSITIVE ELECTROOPTICAL CIRCUIT

Filed Jan. 18, 1956 2 Sheets-Sheet 1

INVENTOR
DENNIS D. WILLARD
BY Campbell, Brumbaugh
Free and Graves
HIS ATTORNEYS

INVENTOR
DENNIS D. WILLARD
BY Campbell, Brumbaugh Free and Graves
HIS ATTORNEYS

United States Patent Office 3,107,301

Patented Oct. 15, 1963

3,107,301

PULSE RESPONSIVE PHOTOSENSITIVE ELECTROOPTICAL CIRCUIT

Dennis D. Willard, Endicott, N.Y., assignor to International Business Machines Corporation, New York, N.Y., a corporation of New York Filed Jan. 18, 1956, Ser. No. 559,960
22 Claims. (Cl. 250—209)

This invention relates generally to electro-optical circuits, and more particularly to electrooptical circuits adapted to undergo changes in state.

It is an object of this invention to provide an electrooptical circuit adapted to change from a first to a second stable state of operation.

Another object of this invention is to provide an electrooptical circuit of the above-noted character which gives a flip-flop action in that the circuit may be caused to revert from its second state back to its first state.

Yet another object of the invention is to provide a circuit of the above-noted character which undergoes a change in state responsive to radiation pulses and/or electric signal pulses of one or of the opposite polarity.

A further object of the invention is to provide circuits of the above-noted character which may be integrated together to give a ring counter action.

These and other objects are realized according to the invention by providing an electrooptical circuit which includes: first and second terminals adapted to be connected to a voltage source; a first resistance and a first gas discharge lamp coupled between these terminals such that the first resistance is nearest the first terminal; and a second resistance and a second gas discharge lamp coupled in a path which is in parallel relation to the first resistance and lamp, and coupled in this path in series relation with each other such that the second resistance is between the first terminal and the second lamp. A first photoconductive cell is electrically coupled in parallel relation to the second lamp and optically coupled to the first lamp to receive light therefrom, while a second photoconductive cell is electrically coupled in parallel relation to the first lamp and optically coupled to the second lamp to receive light therefrom. A capacitance is interposed in circuit between the second cell and the first lamp.

Each of the described lamps is individually adapted to assume either a fired condition or an unfired condition, but, from the nature of the circuit, only one of the two lamps can be in a stabilized firing position at one time. The described circuit thus has a first state wherein one lamp is in a stabilized fired condition, and a second state wherein the other lamp is in a stabilized fired condition.

A change in the circuit from first to second state is induced in the circuit by causing a signal pulse to be applied thereto. This signal pulse acts on the circuit to effect a transposition of the fired lamp condition and the unfired lamp condition among the two lamps such that the lamp which was previously unfired is now fired and the lamp which was previously fired is now unfired.

For a better understanding of the invention, reference is made to the following description of exemplary embodiments thereof, the description to be taken with the accompanying drawings wherein.

A convention which is used in the following description is that counterpart elements are given the same primary designation in that they are designated by the same letter or by the same number, but that these counterpart elements are distinguished from each other by utilizing different secondary or "suffix" designations for the several elements. It will be understood in the description to follow that, unless the context otherwise requires, any description of an element having a certain primary designation and a certain suffix designation shall be taken to also apply to any element having the same primary designation, but having a different suffix designation.

Figure 1:
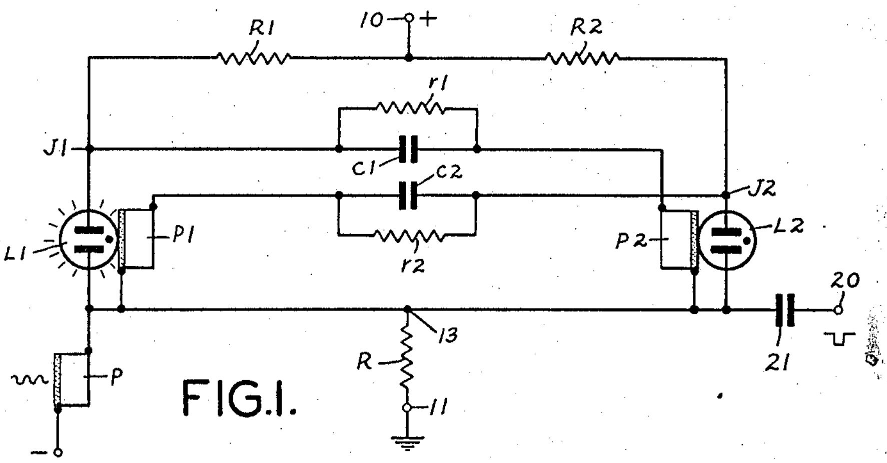
FIG. 1 is a schematic diagram of an exemplary electrooptical circuit according to the invention.

Referring now to FIG. 1, this figure shows an electrical optical circuit adapted to act as a flip-flop circuit. The circuit is energized through a first terminal 10 and a second terminal 11 repectively adapted to be connected to the positive and negative ends of a voltage source (not shown). As indicated in FIG. 1, the second terminal 11 may be a grounded terminal. The current flow from terminal 10 to terminal 11 may follow either of two main current paths. The first of these paths is through (in the order named) a resistance provided by a resistor R1, a junction J1, a gas discharge lamp L1, and an impedance provided by, say a resistor R. The second of these current flow paths is through, in the order named, a resistance provided by a resistor R2, a junction J2, a gas discharge lamp L2, and the impedance provided by resistor R. The circuit thus includes a first branch of elements R1 and L1 in series relation to each other, and a second branch of elements R2 and L2 in series relation to each other, the two mentioned branches being coupled in parallel relation between terminal 10 and a common junction 13 of these branches with resistor R.

The lamps L1, L2 perform the dual function of creating two stable states for the FIG. 1 circuit, and of providing different visual indications when the circuit is in one and the other of these states. To this end, the lamps L1, L2 take the form of gas discharge devices adapted to emit radiant energy such as visible light when the devices are in a fired condition. Suitable gas discharge devices of this sort are provided by glow tubes (e.g. neon glow tubes) or flash tubes, both types of tubes being well known in the art.

It will be noted that either type tube is characterized by the feature that the value of potential necessary to initiate an electrical discharge in the tube is substantially greater than the value of potential necessary to sustain the discharge subsequent to initiation thereof. The former and the latter of these two potential values will be referred to hereinafter as the "firing voltage value" and the "conducting voltage value." It will also be noted that gas discharge tubes of the sort described are devices which, during the fired condition thereof, characteristically maintain the voltage between their electrodes at a substantially constant value which is the conducting voltage value for the device.

It will be evident that each of lamps L1 and L2 may be either in a fired or an unfired condition. It will also be evident, if the FIG. 1 circuit is to act as a flip-flop, that the respective conditions of the lamps L1, L2 must be correlated in such manner that when, say, lamp L1 is in stable fired condition, the lamp L2 is in stable unfired condition, and conversely. Moreover, the FIG. 1 circuit must be adapted to transpose the fired lamp condition and the unfired lamp condition among the two lamps to thereby change the circuit from a first state represented by L1 in fired condition to a second state represented by L2 in fired condition.

This transposition of lamp conditions is obtained in the FIG. 1 circuit by providing a pair of circuit paths which cross-couple the lamps L1 and L2. The first of these paths includes a capacitance, provided by a capacitor C1, and a photoconductive cell P2 serially connected in the order named from the junction J1 of R1 and L1 to junction 13 such that the cell P2 is electrically coupled in parallel relation to lamp L1 and optically coupled to lamp L2 to receive the radiant energy emitted therefrom when the lamp L2 is fired. The second of these paths includes a capacitance, provided by a capacitor C2, and a photoconductive cell P1 serially connected in the order named from the junction J2 of R2 and L2 to junction 13 such that the cell P1 is electrically coupled in parallel relation to lamp L2 and optically coupled to lamp L1 to receive the radiant energy emitted therefrom when lamp L1 is fired. The capacitances C1, C2 in these paths are respectively shunted by the by-pass resistors *r*1, *r*2.

The cells P1, P2 are, as stated, of the photoconductive type (rather than the photovoltaic type) to thereby act as variable impedances in the FIG. 1 circuit. It is characteristic of such type cells that the impedance value thereof is very high and very low when, respectively, the cells are not exposed to light, and when the cells are exposed to light of an intensity on the order of that which falls on the cells P1, P2 from the lamps L2, L1 when in fired state. Preferably, the cells P1, P2 are of a type which provides high electrical sensitivity to the radiation falling thereon. Thus, the cells P1, P2 may be, say, cadmium sulfide cells which in commercially available form provide a radiation sensitivity of 100 microamperes at 100 volts and 2 foot candles.

The FIG. 1 circuit is adapted to undergo a flip-flop action in response to a negative-going trigger pulse applied across the resistor R. This trigger pulse may be obtained either from an electrical input signal or from an optical input signal to the FIG. 1 circuit. The electrical input signal takes the form of a negative-going square wave applied from a terminal 20 through a capacitor 21 and the junction 13 to the resistor R. The series connection of capacitor 21 and resistor R acts as a differentiating circuit for the square wave to produce the negative-going trigger pulse from the leading negative-going edge of the square wave.

The optical input signal is provided by a radiation pulse which is applied to a photoconductive cell P connected betwen the junction 13 and a source (not shown) of a voltage which is negative with respect to ground. In response to the radiation pulse applied thereto, the impedance of P drops radically to cause a current surge from terminal 11 through resistor R, junction 13 and cell P to the mentioned negative voltage source. This current surge develops across resistor R a voltage surge in the nature of a negative-going trigger pulse.

A simplified explanation of the mode of operation of the FIG. 1 circuit is as follows. Assume initially that lamp L2 is in unfired condition, that lamp L1 is in fired condition such that the voltage $V_{L1}$ across the lamp L1 is at the conducting voltage value therefor and that the FIG. 1 circuit is in a "first" steady operating state. In this first state, since cell P2 presents high impedance to flow of current from J1 through *r*1 and P2 to junction 13, the voltage $V_{C1}$ across capacitor C1 will be substantially smaler than $V_{L1}$.

In respect to unfired lamp L2, despite the fact that this lamp initially presents an open circuit to flow of current through resistor R2, there will still be a flow of current through this resistor by way of the current path from terminal 10 through R2, *r*2, P1, junction 13, and R to terminal 11. The impedance values of R2, *r*2 and P1 are so related that, when lamp L2 is unfired, the value of the voltage $V_{L2}$ across this lamp is intermediate the firing voltage value thereof and the conducting voltage value thereof. Initially, therefore, the voltage $V_{L2}$ across lamp L2 is greater than $V_{L1}$, and the capacitance C2 will be charged to a voltage $V_{C2}$ which is slightly lesss than $V_{L2}$ but substantially greater than $V_{C1}$.

When the negative trigger pulse appears across resistor R, the effect of this trigger pulse is to produce a sharp drop in the voltage of junction 13 with respect to ground. Inasmuch as the fired lamp L1 is a constant voltage device, there is a tendency for junction J1 to follow the drop of junction 13 to thereby tend to maintain a constant voltage betwen junctions J1 and 13. Also, in the view that lamp L2 is unfired, the cell P2 has a very high impedance to thereby limit to a small value the charging current which can flow to C1. It follows from both these effects that the charging, if any, of C1 to increase $V_{C1}$ will occur at a very slow rate.

The initial voltage drop across junction 13 is communicated in large part to the junction J2 through P1 and C2 because of the facts that P1 is of low impedance, and that the voltage $V_{C2}$ cannot change instantaneously. Following this initial voltage drop, however, the increased voltage between terminal 10 and junction 13 causes further charging of capacitor C2, and this further charging takes place rapidly because of the low impedance of cell P1. This increase in charge of C2 increases $V_{C2}$ to the point where, when the negative trigger pulse terminates to produce a sharp voltage rise of junction 13, P1, and C1, the increased value of $V_{C2}$ causes a rise at junction J2 sufficient to bring $V_{L2}$ above the firing voltage value for lamp L2. Thereupon, the lamp L2 fires to render the FIG. 1 circuit in a momentary state wherein both of lamps L1 and L2 are fired.

As soon as lamp L2 has fired, the capacitor C2 starts to discharge rapidly through this lamp and through the cell P1 in the return path for current from C2. If this rapid discharge of C2 were permitted to continue, the voltage $V_{C2}$ would diminish to the point where the voltage $V_{L2}$ across lamp L2 would drop below the conducting voltage value for this lamp to thereby extinguish the lamp. Such drop of $V_{L2}$ below conducting voltage value would occur for the reason that the low impedance of L2 when fired and the low impedance of P1 when receiving light from L1 together represent a resultant impedance of such low value that the current drawn thereby through R2 would drive $V_{L2}$ below conducting value were it not for the sustaining effect of $V_{C2}$. To express it another way, the discharge of C2 causes $V_{L2}$ to asymptotically drop down towards the steady state value which would exist if lamp L2 remained fired and if cell P1 remained low in impedance, and this value towards which $V_{L2}$ approaches is below the conducting voltage value for lamp L2.

The discharge of C2 does not continue, however, to the point where lamp L2 is extinguished for the reason that the firing of L2 has the counteracting effect of applying radiation to P2 to thereby drop the impedance of this cell to a very low value. This change in impedance of P2 renders the circuit for lamp L1 in the same unstable condition as that just described for lamp L2, namely, that the fired lamp L1 and the low impedance of P2 together provide a very low value resultant impedance which causes the voltage $V_{L1}$ to asymptotically drop down towards a steady state value below the conducting voltage value for lamp L1. This drop in $V_{L1}$ does not, however, start downward from above the firing voltage value for the lamps, as does the drop in $V_{L2}$, but instead starts down from, substantially, the conducting voltage value for the lamps. Accordingly, as $V_{L1}$ starts to drop, the dropping characteristic thereof causes almost immediate extinction of lamp L1.

When lamp L1 is thus extinguished, the impedance of P1 increases sharply to terminate the rapid discharge of C2. From this point on, the voltages and currents in the FIG. 1 circuit adjust themselves to bring the circuit to a second stable operating state wherein conditions are the reverse from those which obtain in the already-described initial stable operating state of the circuit. In this second state, the lamp L2 will be fired and the lamp L1 unfired, the cell P2 will have a low impedance and the cell P1 a high impedance, the voltage $V_{L2}$ will be at the conducting voltage value for lamp L2, the voltage $V_{L1}$ will be between the firing and conducting voltage values for lamp L1, and the voltage $V_{C1}$ will be larger than the voltage $V_{C2}$. From what has been said, it will be seen that a second negative trigger pulse applied to resistor R will cause the FIG. 1 circuit to undergo another change such that the circuit is changed from the second state back to the first state. Similarly, a third trigger pulse will cause the FIG. 1 circuit to again change from the first to the second state, and so on. Thus, the FIG. 1 circuit is characterized by a flip-flop action.

Figure 2:
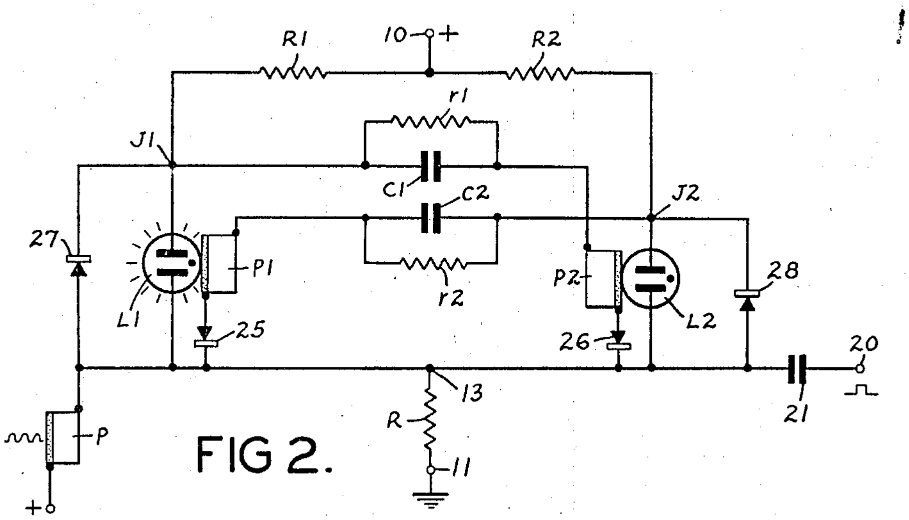
FIG. 2 is a schematic diagram of a modification of the circuit of FIG. 1.

Referring now to FIG. 2, the circuit shown thereby represents the FIG. 1 circuit as modified to respond to a positive pulse. The FIG. 2 circuit differs from the FIG. 1 circuit in that the circuit paths of C1, P2 and of C2, P1 have been polarized such that each path conducts current much better in the direction from terminal 10 to junction 13 than in the direction from junction 13 to terminal 10. The mentioned currents paths may be rendered polarized in this manner either by using polarized photoconductive cells for the cells P1, P2, or by connecting a partial rectifier 25 between P1 and junction 13 and another partial rectifier 26 between P2 and junction 13. The FIG. 2 circuit also differs from the FIG. 1 circuit in that the photoconductive cell P is connected between junction 13 and a source of voltage which is positive rather than negative with respect to ground. As another desirable but not indispensable feature, a pair of rectifying diodes 27, 28 may each be connected at one end to junction 13 and respectively connected at the other end to junctions J1 and J2, both diodes being connected with a polarity to conduct current away from junction 13 but to oppose current flow towards junction 13. The diodes 27, 28 serve to overcome the slowness in response which would otherwise be caused in the FIG. 2 circuit by interelectrode and distributed capacitance.

The operation of the FIG. 2 circuit may be explained in the following manner. Assume that initially the FIG. 2 circuit is in the same state as that described as the first state for the FIG. 1 circuit. In other words, in the FIG. 2 circuit the lamp L1 will initially be fired, the lamp L2 will initially be unfired, and so on. A positive trigger pulse is then applied across resistor R, this trigger pulse being derived either from an electric triggering signal applied to terminal 20 or from the drop in impedance of cell P in response to a radiation pulse impinging thereon. This positive trigger pulse is sufficient in amplitude to drive junction 13 to a voltage value above ground whose difference from the voltage of terminal 10 to ground is less than the conducting voltage value for lamp L1. Moreover, this sharp voltage rise of junction 13 is not communicated in any substantial extent to the junctions J1, J2 through the respective paths P2, C1 and P1, C2 for the reason that the partial rectifiers 25, 26 act as high impedances in the direction in which the voltage rise would have to be communicated. It follows that the voltage $V_{L1}$ across lamp L1 will be driven below the conducting voltage value for this lamp, and the lamp L1 will accordingly be extinguished. The FIG. 1 circuit is thus rendered in a momentary condition wherein both of lamps L1 and L2 are extinguished, and wherein both of cells P1 and P2 have a high impedance.

As the impedance of P1 rises sharply in response to extinction of L1, the increase in impedance of P1 causes a readjustment of the voltage values in the current path consisting of R2, C2 and *r*2 in parallel, and P1. Since the voltage $V_{C2}$ across C2 and *r*2 cannot change instantaneously, the major transient changes in this current path are that the resistor R2 develops a lesser fraction and the cell P1 a larger fraction of the then-existing voltage between points 10 and 13 than these elements did before cell P1 changed impedance. By virtue of these voltage changes across R2 and P1, the voltage at point J2 is raised to a value sufficient to fire lamp L2 at the time that the voltage at junction 13 starts to drop to its usual level upon termination of the positive trigger pulse. No such effect occurs at junction J1 (the impedance of P2 did not change), and the voltage of this junction to junction 13 accordingly remains below the firing voltage value of lamp L1 during the time that junction 13 drops back to its usual level in respect to ground.

It follows that, when the positive trigger pulse does terminate, the lamp L2 will fire, but the lamp L1 will not fire. When lamp L2 fires, the impedance of P2 responsively drops to a low value, and the FIG. 2 circuit thereafter adjusts itself as before to a new condition of stable current and voltage relations within the circuit. It will be recognized that this new condition of the FIG. 2 circuit is equivalent to the second state of the FIG. 1 circuit wherein the lamp L2 is fired and the lamp L1 is unfired.

Figure 3:
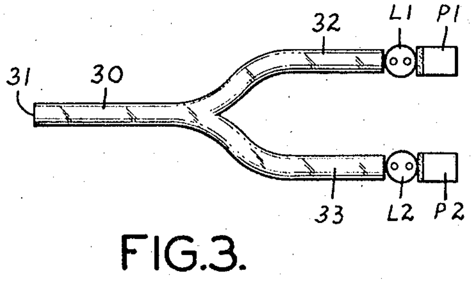
FIGS. 3 and 4 are views of light duct arrangements adapted to be used with the FIG. 2 circuit.

FIG. 3 shows a modification of the FIG. 2 circuit whereby this circuit may be triggered by radiation pulses applied to the cells P1, P2. As indicated by FIG. 3, the radiation pulses may be transmitted to the cells by a radiant energy conductor means in the form of a light duct 30 having an input 31 and a pair of branches 32, 33 which terminate at the lamps L1, L2 to project light through these lamps onto the photosensitive surfaces of the cells P1, P2. With a radiant energy conductor means of this form, any light pulse received at input 31 will be simultaneously applied to cells P1, P2. It will be evident, however, that the radiant energy conductor means may also take the form shown in FIG. 4 wherein radiation pulses are respectively transmitted to the cells P1, P2 by the separate light ducts 34, 35. In the FIG. 4 modification, the radiation pulses are alternately applied to the ducts 34, 35, and the pulses are applied in the sequence which causes each pulse to be transmitted to the cell which at that time is of high impedance because of the unfired condition of the lamp associated therewith.

The circuits represented by FIGS. 2 and 3, taken together, or by FIGS. 2 and 4, taken together, will operate in the following manner. Assume that the FIG. 2 circuit is in the already-described first state wherein lamp L1 is fired and lamp L2 is unfired. A radiation pulse is then applied to both cells P1 and P2 when the FIG. 3 modification is used, or to cell P2 only when the FIG. 4 modification is used. Both of these last-named modifications produce one and the same effect, namely, a sharp drop in the impedance of cell P2. That the same effect is obtained in both cases will be evident from the fact that the light pulse applied to cell P1 by the FIG. 3 modification will have no effect on cell P1 inasmuch as the impedance of this cell is already very low as a result of the fired condition of lamp L1.

The sharp drop in impedance of cell P2 causes a transient readjustment of the voltage values in the current path consisting of resistor R1, capacitance C1 and resistor *r*1 in parallel, and cell P2. Since the voltage $V_{C1}$ across C1 cannot change instantaneously, the major change which takes place in this transient readjustment is that R1 and P2 respectively develop larger and lesser fractions of the total voltage between points 10 and 13 than the voltage fractions developed by these elements before the change in impedance of P2 took place. The larger voltage drop across R1 will reduce the voltage $V_{L1}$ beyond the conduction voltage value for lamp L1 to thereby cause extinguishment of this lamp. When lamp L1 is extinguished, the resulting sharp rise in impedance of cell P1 causes lamp L2 to be fired for the reasons already given. When lamp L2 fires, the FIG. 2 circuit adjusts itself to assume a stable second state in the manner already described.

Figure 5:
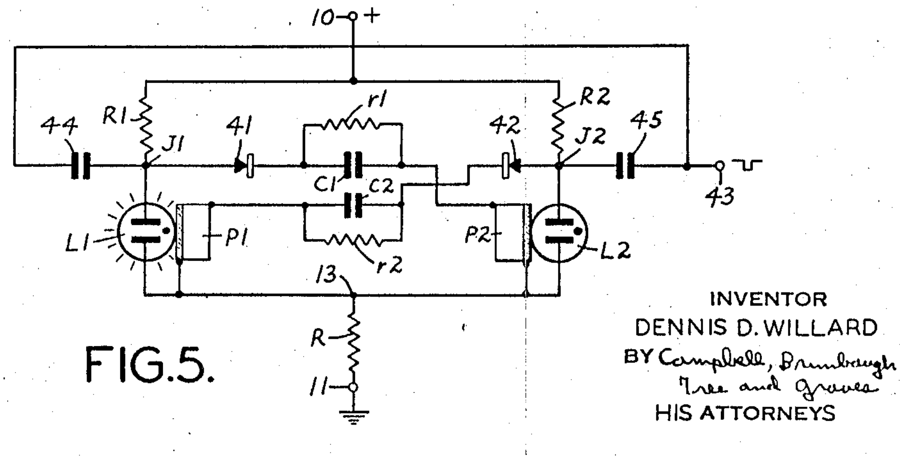
FIG. 5 is a view in schematic diagram of another modification of the FIG. 1 circuit.

FIG. 5 shows another modification of the FIG. 1 circuit. The FIG. 5 circuit differs principally from the FIG. 1 circuit in that (1) a partial rectifier 41 is connected between junction J1 and capacitor C1 to conduct current substantially better in a direction from J1 to C1 than in the opposite direction, (2) a similar partial rectifier 42 is connected in a similar manner between junction J2 and capacitor C2, and (3) a negative-going trigger pulse is applied simultaneously to the junctions J1, J2. This negative trigger pulse may be developed, for example, by applying a negative-going square wave to a terminal 43 which is coupled to the junction J1 by a capacitor 44 and to the junction J2 by a capacitor 45. The capacitors 44, 45 act in conjunction with the resistances in the FIG. 5 circuit to differentiate the negative-going square wave to thereby develop the negative trigger pulse from the leading edge of the square wave.

The FIG. 5 circuit operates in the following manner. Assume that the FIG. 5 circuit is initially in a first state corresponding to the already-described first state for the FIG. 1 circuit. In this first state the lamp L1 will be fired, and the lamp L2 will be unfired. When the negative trigger pulse is applied to junction J1, the trigger pulse drops voltage $V_{L1}$ down below the conducting value for lamp L1 to thereby extinguish lamp L1. The negative trigger pulses on junctions J1 and J2 are prevented from producing any substantial discharges of capacitors C1, C2 by the partial rectifiers 41, 42 which present a high impedance to current flow in the direction necessary to cause these discharges.

When lamp L1 is extinguished, the impedance of P1 rises sharply to thereby produce a readjustment in voltage values in the current path of resistor R2, rectifier 42, capacitor C2 and resistor *r*2 in parallel, and cell P1. This readjustment in voltage values takes place in the manner already described for the FIG. 2 circuit to cause a substantial voltage rise at junction J2. The readjustment of the FIG. 5 circuit differs from that of the FIG. 2 circuit to the extent that a back voltage is developed across partial rectifier 42, but even in the presence of this back voltage, the voltage at J2 is raised sufficiently that the voltage $V_{L2}$ across lamp L2 is above the firing voltage value thereof. The described readjustment accordingly produces a firing of lamp L2. The firing of lamp L2 reduces the impedance of cell P2 to set into motion the current and voltage adjustments in the FIG. 2 circuit which brings this circuit to the new second stable stage of operation wherein the lamp L2 is fired and the lamp L1 is unfired.

Figure 4:
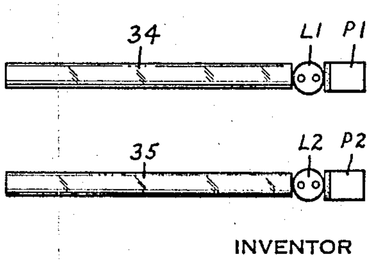

It should be noted that the resistor R is not utilized in the FIG. 3, FIG. 4 and FIG. 5 modifications for the purpose of injecting trigger pulses into the circuit. The resistor R is thus not a necessary feature of the invention herein in its broadest sense.

Figure 6:
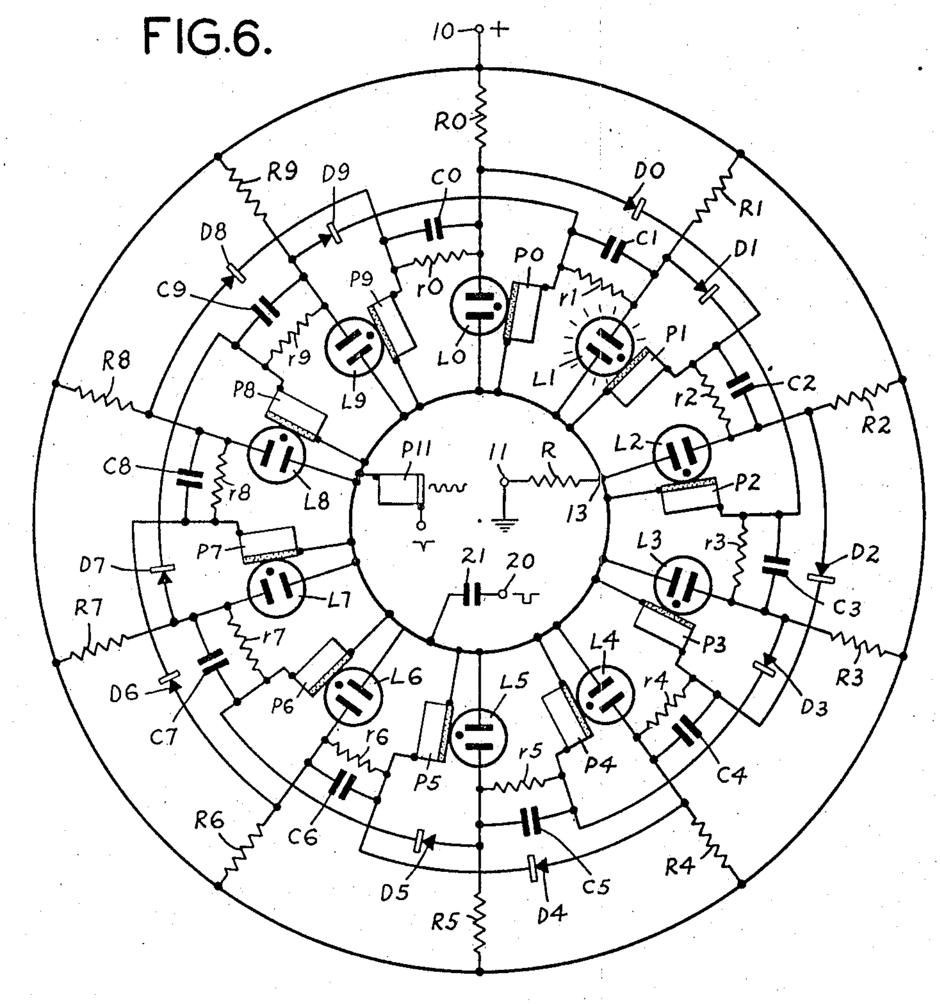
FIG. 6 is a schematic diagram of a ring counter circuit according to the present invention.

FIG. 6 shows a ring counter circuit. This circuit includes a zero stage comprised of a resistor R0, a lamp L0 and a photoconductive cell P0, a first stage comprised in like manner of the like elements R1, L1, P1, a second stage comprised in like manner of the like elements R2, L2, P2, and so on, through a number of more like stages up through the stage of elements R9, L9, P9. Each such stage in the FIG. 6 circuit is analogous to a single one of the two stages of R1, L1, P1 and R2, L2, P2 in the FIG. 1 circuit. In the first stage of the FIG. 6 circuit, for example, the resistor R1 and the lamp L1 are coupled in series relation between the terminal 10 and the junction 13 as in the FIG. 1 circuit, and the junction 13 is coupled to grounded terminal 11 through a resistor R as in the FIG. 1 circuit. As shown in FIG. 6, the several stages of the FIG. 6 circuit form a ring.

In the FIG. 6 circuit, any given stage is capacitively coupled to the stage which is next succeeding in a clockwise direction around the ring. For example, the first stage R1, L1, P1 is coupled to the second stage R2, L2, P2 by a circuit path which extends: from junction 13, through cell P1 in optically coupled relation to lamp L1 to receive light therefrom, further through capacitor C2 and the by-pass resistor *r*2 connected in parallel to C2, and to the junction J2 of the resistor R2 and lamp L2. It will be recognized that the circuit path just described is the same circuit path as that formed by the elements P1, C1 and *r*1 in the FIG. 1 circuit. The FIG. 6 circuit differs from the FIG. 1 circuit, however, in that the circuit path formed of elements P2, C2 and *r*2 is connected from junction 13 to the junction J3 rather than being connected from junction 13 to the junction J1. The FIG. 6 circuit also differs from the FIG. 1 circuit in that the stage R1, L1, P1 is coupled to the stage to the left hand thereof as well as to the stage to the right hand thereof. This additional coupling is made by connecting the junction of cell P1 and capacitor C2 to the junction J0 through a rectifier D0 which is polarized to conduct current better from J0 to P1 than from P1 to J0.

The description just given for the couplings of the first stage applies analogously to every other stage of the ring counter circuit. In other words, each given stage in the ring circuit is capacitively coupled in like manner to the stage which next succeeds the given stage in a clockwise direction around the ring, and each given stage is also coupled in like manner through a rectifier to the next preceding stage in this clockwise direction.

The mode of operation of the FIG. 6 ring circuit is in some respects similar to the mode of operation of the FIG. 1 circuit. As a demonstration of this fact, assume, for example, that initially the lamp L1 of the FIG. 6 circuit is fired, and that all the other lamps of the circuit are unfired. A negative trigger pulse is then applied across resistor R in the same manner as in the FIG. 1 circuit, namely, by applying a negative-going square wave to the terminal 20 in the FIG. 6 circuit, or by applying a light pulse to the photoconductive cell P in the FIG. 6 circuit. This negative trigger pulse causes lamp L2 to be fired in the same manner as this lamp is fired by a negative trigger pulse in the FIG. 1 circuit. When lamp L2 fires, the impedance of cell P2 drops sharply to cause a surge of current through rectifier D1. This current surge causes a voltage surge in resistor R1 which drives the voltage $V_{L1}$ of lamp L1 below the conducting voltage value for this lamp. Lamp L1 will accordingly be extinguished. Meanwhile, the sharp drop in impedance of cell P2 adjusts the current and voltage relations in the third stage to condition lamp L3 to be fired by the next received negative trigger pulse. This conditioning for firing of the lamp L3 by the firing of lamp L2 takes place in the FIG. 6 circuit in substantially the same manner as in the FIG. 1 circuit the lamp L1 is conditioned to be fired by the firing of the lamp L2.

From what has been said, it will be seen that successive negative trigger pulses applied to resistor R will cause the fired lamp condition to be advanced in lamp-by-lamp steps in a clockwise direction around the ring. The position of the fired lamp condition in the ring can be read out when and as desired.

The FIG. 6 circuit is, as described, adapted to give a ring counter action upon receipt of negative trigger pulses. By modifying the FIG. 6 circuit in the same manner as the FIG. 1 circuit is modified to give the FIG. 2 circuit, the FIG. 6 circuit can be rendered drivable by positive trigger pulses in the same manner as the FIG. 2 circuit is drivable by positive trigger pulses. This modification of the FIG. 6 circuit is made by either utilizing therein a plurality of photoconductive cells P0, P1, P2, and so on, which are polarized to conduct current better towards junction 13 than away from junction 13, or by interposing partial rectifiers between these cells and junction 13 in the same manner as partial rectifiers are interposed between junction 13 and the cells P1, P2 in the FIG. 2 circuit.

The above-described embodiments being exemplary only, it will be understood that the invention herein comprehends embodiments differing in form or detail from the above-described embodiments. For example, electrooptical circuits according to the invention may be adapted to be operated by only an electrical read in, only an optical read in, or indifferently by either an electrical or an optical read in. Moreover, for any one of the three kinds of read in just described, electrooptical circuits according to the invention may be adapted to give only an electrical read out (by output leads from junctions J1, J2, etc.), only an optical read out (by light ducts receiving light from lamps L1, L2, etc.), or both an electrical read out and an optical read out. Accordingly, the invention is not to be considered as limited save as is consonant with the scope of the following claims.

I claim:

1. An electrooptical circuit comprising, first and second terminals adapted to be connected to a voltage source, a first resistance and a first gas discharge lamp coupled in series relation between said terminals such that said first resistance is nearest said first terminal, a second resistance and a second gas discharge lamp coupled in a path in parallel relation to said first resistance and lamp and coupled in series relation with each other such that said second resistance is between said first terminal and said second lamp, each lamp being adapted to individually assume at different times a fired condition and an unfired condition, but only one at a time of said lamps being adapted to assume the fired condition, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, and a capacitance and a by-pass resistance therefor conjointly interposed in circuit between said second cell and said first lamp, said capacitance being responsive to a communicated voltage pulse to transpose among said lamps a fired condition before said pulse of one of said lamps and an unfired condition before said pulse of the other of said lamps.

2. An electrooptical circuit comprising, first and second terminals adapted to be connected to a voltage source, an impedance coupled to said second terminal, a first resistance and a first gas discharge lamp coupled in series relation in the order named in a current path from said first terminal to said impedance, a second resistance and a second gas discharge lamp coupled in series relation in the order named in another current path from said first terminal to said impedance, each lamp being adapted to individually assume at different times a fired condition and an unfired condition, but only one at a time of said lamps being adapted to assume the fired condition, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, and a capacitance and a by-pass resistance therefor conjointly interposed in circuit between said second cell and said first lamp, said capacitance being responsive to a communicated voltage pulse to transpose among said lamps a fired condition before said pulse of one of said lamps and an unfired condition before said pulse of the other of said lamps.

3. An electrooptical circuit comprising, first and second terminals adapted to be connected to a voltage source, an impedance coupled to said second terminal, a first resistance and a first gas discharge lamp coupled in series relation in the order named in a current path from said first terminal to said impedance, a second resistance and a second gas discharge lamp coupled in series relation in the order named in another current path from said first terminal to said impedance, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, a capacitance and a by-pass resistance therefor conjointly interposed in circuit between said second cell and said first lamp, and means to apply a voltage pulse across said impedance.

4. A circuit as in claim 3 in which said voltage pulse applying means is a photoconductive cell coupled in parallel relation to said impedance.

5. An electrooptical ring counter circuit comprising, first and second terminals adapted to be connected to a voltage source, a plurality of at least three circuit branches associated in a ring and coupled to said first terminal in parallel relation with each other to provide for current flow through each thereof from said first to said second terminal, each circuit branch including a resistance and a gas discharge lamp coupled in series relation such that the former is between said first terminal and the latter, a plurality of photoconductive cells, each cell being optically coupled to a given one of said lamps to receive light therefrom and being electrically coupled in parallel relation to both the lamp which succeeds and the lamp which precedes said given lamp in one direction around said ring, a polarized conductor means interposed in circuit between each photoconductive cell and the lamp in preceding relation therewith to provide better current flow in the direction from said last-named lamp through the photoconductive cell to said impedance than in the opposite direction, and a capacitance and a by-pass resistance therefor conjointly interposed in circuit between each photoconductive cell and the lamp in succeeding relation therewith.

6. An electrooptical ring counter circuit comprising, first and second terminals adapted to be connected to a voltage source, an impedance coupled to said second terminal, a plurality of at least three circuit branches associated in a ring and coupled in parallel relation between said first terminal and said impedance, each circuit branch including a resistance and a gas discharge lamp coupled in series relation such that the former is between said first terminal and the latter, a plurality of photoconductive cells, each cell being optically coupled to a given one of said lamps to receive light therefrom and being electrically coupled in parallel relation to both the lamp which succeeds and the lamp which precedes said given lamp in one direction around said ring, a polarized conductor means interposed in circuit between each photoconductive cell and the lamp in preceding relation therewith to provide better current flow in the direction from said last-named lamp through the photoconductive cell to said impedance than in the opposite direction, a capacitance and a by-pass resistance therefor conjointly interposed in circuit between each photoconductive cell and the lamp in succeeding relation therewith, and means to apply a voltage pulse across said impedance.

7. A circuit as in claim 6 in which said voltage pulse applying means is a photoconductive cell coupled in parallel relation to said impedance.

8. An electrooptical circuit comprising, first and second terminals adapted to be connected to a voltage source, a first resistance and a first gas discharge lamp coupled in series relation between said terminals such that said first resistance is nearest said first terminal, a second resistance and a second gas discharge lamp coupled in a path in parallel relation to said first resistance and lamp and coupled in series relation with each other such that said second resistance is between said first terminal and said second lamp, each lamp being adapted to individually assume at different times a fired condition and an unfired condition, but only one at a time of said lamps being adapted to assume said fired condition, a first photoconductive cell electrically coupled in parallel relation to said second lamp in a polarized current path providing substantially better current flow in the direction from said second lamp through said first photoconductive cell to said second terminal than in the opposite direction, said first photoconductive cell being optically coupled to said first lamp to receive light therefrom, a second photoconductive cell electrically coupled in parallel relation to said first lamp and optically coupled to said second lamp to receive light therefrom, and a capacitance and a by-pass resistance therefor conjointly interposed in circuit between said second cell and said first lamp, said capacitance being responsive to a communicated voltage pulse applied thereto transpose among said lamps a fired condition before said pulse of one of said lamps and an unfired condition before said pulse of the other of said lamps.

9. A circuit as in claim 8 in which said polarized current path is provided by polarized conductor means interposed in circuit between said first photoconductive cell and said second lamp.

10. A circuit as in claim 8 in which said polarized current path is provided by a polarized form of said first photoconductive cell.

11. An electrooptical circuit comprising, first and second terminals adapted to be connected to a voltage source, a first resistance and a first gas discharge lamp coupled in series relation between said terminals such that said first resistance is nearest said first terminal, a second resistance and a second gas discharge lamp coupled in a path in parallel relation to said first resistance and lamp and coupled in series relation with each other such that said second resistance is between said first terminal and said second lamp, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, a first capacitance and a by-pass resistance therefor conjointly interposed in circuit between said second photoconductive cell and said first lamp, and a second capacitance and a by-pass resistance therefor conjointly interposed in circuit between said first photoconductive cell and said second lamp.

12. An electrooptical circuit comprising, first and second terminals adapted to be connected to a voltage source, a first resistance and a first gas discharge lamp coupled in series relation between said terminals such that said first resistance is nearest said first terminal, a second resistance and a second gas discharge lamp coupled in a path in parallel relation to said first resistance and lamp and coupled in series relation with each other such that said second resistance is between said first terminal and said second lamp, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, a first capacitance and a by-pass resistance therefor conjointly interposed in circuit between said second photoconductive cell and said first lamp, a second capacitance and a by-pass resistance therefor conjointly interposed in circuit between said first photoconductive cell and said second lamp, and light duct means to apply light pulses to said two photoconductive cells.

13. A circuit as in claim 12 in which said light duct means is adapted to apply the same light pulse simultaneously to both said photoconductive cells.

14. A circuit as in claim 12 in which said light duct means is in the form of a pair of light ducts adapted to respectively apply separate light pulses to said two photoconductive cells.

15. An electrooptical circuit comprising, first and second terminals adapted to be connected to a voltage source, a first resistance and a first gas discharge lamp coupled in series relation between said terminals such that said first resistance is nearest said first terminal, a second resistance and second gas discharge lamp coupled in a path in parallel relation to said first resistance and lamp and coupled in series relation with each other such that said second resistance is between said first terminal and said second lamp, a first photoconductive cell electrically coupled in parallel relation to said second lamp in a polarized current path providing substantially better current flow through said cell in the direction from said first to said second terminal than in the opposite direction, said first cell being optically coupled to said second lamp to receive light therefrom, a second photoconductive cell electrically coupled in parallel relation to said first lamp in a polarized current path providing substantially better current flow through said second cell in the direction from said first to said second terminal than in the opposite direction, said second cell being optically coupled to said second lamp to receive light therefrom, a first capacitance and a by-pass resistance therefor conjointly interposed between said second cell and said first lamp, and a second capacitance and a by-pass resistance therefor conjointly interposed between said first cell and said second lamp.

16. A circuit as in claim 15 in which at least one of said polarized current paths is provided by polarized conductor means coupled in series relation in said one current path with the photoconductive cell therein.

17. A circuit as in claim 15 in which at least one of said polarized current paths is provided by a polarized form of the photoconductive cell therein.

18. A circuit as in claim 15 further characterized by means to inject an electrical voltage pulse into at least one of said polarized current paths.

19. A circuit as in claim 15 further characterized by light duct means to apply light pulses to at least one of said photoconductive cells.

20. An electrooptical circuit comprising, first and second terminals adapted to be connected to a voltage source, an impedance coupled to said second terminal, a first resistance and a first gas discharge lamp coupled in series relation in the order named in a current path from said first terminal to said impedance, a second resistance and a second gas discharge lamp coupled in series relation in the order named in another current path from said first terminal to said impedance, a first photoconductive cell electrically coupled in parallel relation to said second lamp and optically coupled to said first lamp to receive light therefrom, a second photoconductive cell electrically coupled in parallel relation to said first lamp and optically coupled to said second lamp to receive light therefrom, a first capacitance and a by-pass resistance therefor conjointly interposed in circuit between said second photoconductive cell and said first lamp, a second capacitance and a by-pass resistance therefor conjointly interposed in circuit between said first photoconductive cell and said second lamp, and light duct means to apply light pulses to said two photoconductive cells.

21. An electrooptical circuit comprising, first and second terminals adapted to be connected to a voltage source, an impedance coupled to said second terminal, a first resistance and a first gas discharge lamp coupled in series relation in the order named in a current path from said first terminal to said impedance, a second resistance and a second gas discharge lamp coupled in series relation in the order named in another current path from said first terminal to said impedance, a first photoconductive cell electrically coupled in parallel relation to said second lamp in a polarized current path providing substantially better current flow through said cell in the direction from said first to said second terminal than in the opposite direction, said first cell being optically coupled to said second lamp to receive light therefrom, a second photoconductive cell electrically coupled in parallel relation to said first lamp in a polarized current path providing substantially better current flow through said second cell in the direction from said first to said second terminal than in the opposite direction, said second cell being optically coupled to said second lamp to receive light therefrom, a first capacitance and a by-pass resistance therefor conjointly interposed between said second cell and said first lamp, and a second capacitance and a by-pass resistance therefor conjointly interposed between said first cell and said second lamp.

22. A multivibrator circuit comprising two light sources variable in response to an electrical signal applied thereto, a first photoresponsive impedance element connected in electrical parallel relation to a first of said light sources and luminance-coupled to the second of said light sources, a second photoresponsive impedance element connected in electrical parallel relation to the second light source and luminance-coupled to the first light source, means for applying an electrical signal across both said light sources, said circuit having an asymmetry whereby one light source becomes luminant and the other is nonluminant in response to the application of said signal, and means for causing said luminant light source to become nonluminant and said nonluminant light source to become luminant and for effecting such alternations in luminance of said light sources repetitively.

References Cited in the file of this patent

UNITED STATES PATENTS 2,727,683 Allen et al. ------------ Dec. 20, 1955